UNITED STATES PATENT OFFICE.

GEORGE LLEWELLYN DAVIES AND WALTER EDWIN WINDSOR-RICHARDS, OF LONDON, ENGLAND.

PAINT AND PROCESS OF MAKING SAME.

1,192,756.  Specification of Letters Patent.  Patented July 25, 1916.

No Drawing.  Application filed February 6, 1913.  Serial No. 746,682.

*To all whom it may concern:*

Be it known that we, GEORGE LLEWELLYN DAVIES and WALTER EDWIN WINDSOR-RICHARDS, both subjects of the King of England, and residents of London, England, have invented certain new and useful Improvements in Paint and Processes of Making Same, of which the following is a specification.

This invention has for its object improvements in or relating to the manufacture of paint or the like.

The basic material for the manufacture of paint according to this invention consists in a mixture of bodies which are herein called the "lighter oils" obtained by separation from tar, according to the following method. Any suitable tar is heated to a temperature of approximately 180° F. in any suitable manner and this tar is then acidulated by the addition of an acid, such acids for instance as sulfuric, hydrochloric or nitric. This acid is then stirred carefully into the tar for about a minute and a suitable mineral oil such as kerosene, naphtha, gasolene, benzol, petroleum residues or the like added. The quantity of this added oil is approximately double the quantity of acid previously added. In place of the added oil above mentioned any animal or fatty vegetable oil can be used. The process of stirring is continued until the separation due to the acid is complete. The lighter oils are now poured or siphoned off and treated according to the following process. The lighter oils thus secured by the operation of the above process are further treated by means of the repetition of the process described above by acidulation and the addition of oil, whereby a soluble pitch-like substance is obtained free from the lighter portions of the said lighter oils thus forming a black residuum. The said lighter portion is now distilled, which yields a soluble residuum of a brownish color. This residuum is used as a base for paint or varnish in combination with suitable solvents and pigments. The black pitch-like residuum left after the giving off of the lighter oils may be retreated by means of acidulation and addition of oil, and a lighter oil given off and a black residuum thrown off as before in the previous operation. The lighter oils may be again distilled and the brown varnish and paint base further secured. This process can be continued until the acidulation and oil addition amount to approximately 50% when the supernatant fluid is not given off as readily.

The following distillation process is preferably the one used. The lighter oils are distilled in a tar-still of any suitable type up to a head-still temperature of approximately 400° C. which temperature may vary according to the desired softness of the residuum. The oils are then deodorized in any approved manner, but preferably by the operation of ozonized air. This residuum is utilized as a paint base by the addition of a soluble solvent such as naphtha and by the addition of pigments. To the compound thus formed is added any suitable gloss preferably resinate of manganese. This process is not confined to the use of any tar, as all tars may be used with equal success.

Having described our invention, what we claim and desire to secure by U. S. Letters Patent, is:—

1. As a new article of manufacture, a paint base, said base being isolated from tar by first acidulating the heated tar, adding oil to the tar, drawing off the lighter oils thus separated, and distilling said oils, the residue left after said distillation being the previously mentioned paint base.

2. A process for the manufacture of a paint base or the like which consists in acidulating tar, adding oil to the tar, drawing off the lighter oils thus separated, distilling said oils and utilizing the residuum.

3. A process for the manufacture of a paint base or the like, which consists in acidulating tar, adding oil to the tar, drawing off the lighter oils thus separated, distilling the oils to form a soluble residuum, adding pigments to the same, distilling the dark brown oil thus formed, whereby a soluble brown residuum is obtained.

4. A process for the manufacture of a paint base or the like, which consists in acidulating tar, adding oil to the tar, drawing off the lighter oils thus separated, adding turpentine to the same, distilling the dark brown oil thus formed, whereby a soluble brown residuum is obtained.

5. A process for the manufacture of paint or the like, which consists in acidulating tar, adding oil to the tar, drawing off the lighter oils thus separated, distilling the said oils to secure a soluble residuum, adding pigments to the same and a gloss to said compound.

In testimony whereof we have hereunto set our hands in presence of two witnesses.

GEORGE LLEWELLYN DAVIES.
WALTER EDWIN WINDSOR-RICHARDS.

Witnesses:
O. J. WORTH,
CARL R. LOOP.

Copies of this patent may be obtained for five cents each, by addressing the "Commissioner of Patents, Washington, D. C."